United States Patent [19]

Yamada et al.

[11] Patent Number: 5,035,931
[45] Date of Patent: Jul. 30, 1991

[54] MULTI-LAYER PARISON, MULTI-LAYER BOTTLE AND APPARATUS FOR AND METHOD OF MANUFACTURING PARISON AND BOTTLE

[75] Inventors: Tsutoo Yamada; Kenichi Morizumi; Yuji Kamegai; Yasushi Kanno; Takemi Shibuya, all of Shinjuku, Japan

[73] Assignee: Dai Nippon Insatsu K.K., Tokyo, Japan

[21] Appl. No.: 406,390

[22] Filed: Sep. 12, 1989

[30] Foreign Application Priority Data

| Sep. 12, 1988 | [JP] | Japan | 63-227754 |
| Apr. 24, 1989 | [JP] | Japan | 1-104223 |
| Jun. 26, 1989 | [JP] | Japan | 1-163261 |

[51] Int. Cl.$^5$ ............................................. B65D 1/02
[52] U.S. Cl. ................................. 428/35.7; 215/12; 215/31; 428/542.8
[58] Field of Search ............ 428/542.8, 35.7, 36.7; 215/1 C, 31

[56] References Cited

U.S. PATENT DOCUMENTS

| 3,955,697 | 5/1976 | Valyi | 428/36.7 |
| 4,507,258 | 3/1985 | Aoki | 264/250 |
| 4,589,559 | 5/1986 | Hayashi et al. | 264/235 |
| 4,847,129 | 7/1989 | Lollette et al. | 428/35.7 |

*Primary Examiner*—James J. Seidleck
*Attorney, Agent, or Firm*—Sughrue, Mion, Zinn, Macpeak & Seas

[57] ABSTRACT

Each of a multi-layer parison and a bottle formed from the parison has a nine-layer structure including five heat resistant resin layers at their mouth portions. The parison is formed by a hot runner nozzle capable of polyester resin and heat resistant resin at the same time. The bottle is formed by a stretching blow molding apparatus in which the parison is set, the apparatus having a passage for heated and compressed air and a passage for cooling fluid.

9 Claims, 9 Drawing Sheets (a)

(b)

(c)

(d)

(a)

(b)

(c)

(d)

(e)

MULTI-LAYER PARISON, MULTI-LAYER BOTTLE AND APPARATUS FOR AND METHOD OF MANUFACTURING PARISON AND BOTTLE

BACKGROUND OF THE INVENTION

This invention relates to a multi-layer parison and a multi-layer bottle each having a good heat resistance, which are made of polyester and an apparatus for and a method of manufacturing the multi-layer parison and the multi-layer bottle.

Recently, there have appeared bottles made of polyester into which liquid is poured at a temperature of 80° to 90° C. (hot filling) and which are pasteurized with hot water. Therefore, it is required to provide good heat resistance to the mouth portions of the bottles. Because, in general, the mouth portion of the bottle is the first portion to be contacted hot liquid at the time of hot filling, and hot water (with the shower) is poured onto the bottles from a position above the bottles.

In view of these circumstances, various attempts have been made in order to give a heat resistance to a bottle made of polyester.

Japanese Laid-Open Publication 19208/1988 discloses a typical method of providing a heat resistance to a bottle made of polyester, in which a multi-layer parison is firstly made by injecting polyester together with heat resistant resin and is expanded through a stretching blow molding.

However, in this method, only one layer of heat resistant resin is formed between two layers of polyester, and three layers of heat resistant resin are slightly formed at the end of the opening of the mouth portion of the parison. Therefore, the entire mouth portion does not have a good heat resistance.

When the above hot filling, hot shower and pasteurizing operations are performed it is required to give a much better heat resistance to a mouth portion. For this purpose, it is desired to develop a bottle including much heat resistant resin near the mouth portion of a parison.

In general, since heat resistant resin is expensive, it is desired to develop a low-cost bottle in which heat resistant resin is concentrated on the mouth portion thereof which is not stretched, on an intermediate portion between the mouth portion and the shoulder portion thereof, which is not stretched and on the shoulder portion which is directly exposed to hot shower from above, and in which heat resistant resin is not used in the body portion thereof to which a heat resistance can be provided by stretching and heat setting and not used in the bottom portion which can be formed thicker than other portions and is not exposed directly to the hot shower.

In the case of a stretching blow molding of a parison in which heat resistant resin is disposed near the mouth portion and is also disposed at the shoulder portion, and each portion of which has different rates of heat resistant resin, a part of a bottle having been formed is often whitened or clouded and is often deformed by a change with the passage of time or heat shrinkage. It is believed that this phenomenon is caused by different rates of heat resistant resin at each part of the bottle and by different rates of stretching at each part thereof.

SUMMARY OF THE INVENTION

It is an object of this invention to provide a parison for manufacturing a multi-layer bottle having a good heat resistance.

It is another object of this invention to provide a multi-layer bottle having a good heat resistance.

It is still another object of this invention to provide a method of and an apparatus for manufacturing a multi-layer parison and a multi-layer bottle each having good heat resistance without whitening, a change with the passage of time and heat shrinkage.

According to one aspect of this invention, there is provided a parison for manufacturing a bottle made of polyester resin and heat resistant resin, which comprises:
  a) a mouth portion with an opening, which has a heat resistant resin layer at least at each of two inner and outer faces of an upper portion of the mouth portion:
  b) a support ring provided at a lower portion of the mouth portion and projecting outwardly therefrom, the heat resistant resin layer at an outer face of the mouth portion extending from an opening end of the mouth portion to the support ring:
  c) a shoulder portion connected to the mouth portion and expanded outwardly:
  d) a body portion: and
  e) a bottom portion.

According to another aspect of this invention, there is provided a method of manufacturing a multi-layer parison comprising a mouth portion, a support ring provided at a lower portion of the mouth portion, a shoulder portion connected to the mouth portion, a body portion and a bottom portion, which comprises the steps of:
  a) preparing a blow mold having a cavity therein corresponding to a shape of the parison:
  b) injecting a part of polyester resin to fill a part of the cavity with the polyester resin:
  c) injection the polyester resin together with heat resistant resin after a rate of injection of the polyester resin is decreased to form a heat resistant layer approximately at a center position of polyester resin layer with which the cavity is filled;
  d) increasing the rate of injection of the polyester resin while continuing injection of two materials to form a pair of polyester resin layers on the opposite sides of the heat resistant layer; and
  e) injecting polyester resin into a remaining space of the cavity while stopping injection of the heat resistant resin, thereby to form a nine-layer structure including five heat resistant layers at least at a lower portion of the mouth portion of the parison, a heat resistant resin located at an outer surface of the mouth portion being extended from an opening end of the mouth portion to the support ring.

According to still another aspect of this invention, there is provided a bottle manufactured in a manner that a multi-layer parison is expanded and stretched by blow-air, which comprises:
  a) a mouth portion with an opening, which has respective one heat resistant resin layer at least at two inner and outer faces of an upper portion of the mouth portion:
  b) a support ring provided at a lower portion of the mouth portion and projecting outwardly therefrom, the heat resistant resin layer at an outer face of the mouth portion extending from an opening end of the mouth portion to the support ring:
c) a shoulder portion connected to the mouth portion and expanded outwardly:
d) a body portion: and
e) a bottom portion.

According to still another aspect of this invention, there is provided a method of manufacturing a multi-layer bottle made of polyester resin and heat resistant resin, which comprises the steps of:
a) forming a parison including a mouth portion, a support ring located at a lower portion of the mouth portion, a should portion, a body portion and a bottom portion, the mouth portion having a heat resistant resin layer at least at each of two inner and outer faces of an upper portion of the mouth portion:
b) setting the parison into a blow mold;
c) supplying heated and compressed air into the parison set in the blow mold to perform a stretching blow molding operation:
d) holding the heated and compressed air in the blow mold for 3 to 50 seconds and determining temperature of inner walls of the blow mold, contacting the body portion of the bottle at 85° to 130° C. to perform heat treatment to the bottle:
e) supplying cooling fluid into the bottle to cool the bottle rapidly: and
f) releasing the bottle from the blow mold.

According to still another aspect of this invention, there is provided a stretching blow molding apparatus for manufacturing a multi-layer bottle from a multi-layer parison made of polyester resin and heat resistant resin, which comprises:
a) a blow mold comprising a mouth forming mold, a shoulder mold, a body forming mold and a bottom forming mold, temperature of each of which can be adjusted independently:
b) a blow mandrel fixed to the blow mold having a passage for heated and compressed air and a passage for cooling fluid separated from the passage for the heated and compressed air; and
c) a stretching rod inserted into the parison, the bottle being cooled rapidly by the cooling fluid after the heated and compressed air is ejected into the parison to perform a stretching blow molding operation.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

In the accompanying drawings.

DETAILED DESCRIPTION OF THE INVENTION

First, resins for a multi-layer parison as a multi-layer performing article will now be explained.

Thermoplastic resin derived from saturated carboxylic acid and saturated dihydric alcohol can be employed for polyester resin of the multi-layer parison. For the saturated carboxylic acids, there may be used aromatic dicarboxylic acids such as terephthalic acid, isophthalic acid, phthalic acid, naphthalene-1, 4-and-2, 6-dicarboxylic acid, diphenylether-4, 4'-dicarboxylic acid, and the like; aliphatic dicarboxylic acids such as adipic acid, sebacic acid, azelaic acid, 1,10-decanedicarboxylic acid, and the like: and alicyclic dicarboxylic acids such as cyclohexane dicarboxylic acid. For the saturated dihydric alcohols, there may be used aliphatic glycols such as ethylene glycol propylene glycol, trimethylene glycol, tetramethylene glycol, diethylene glycol, polyethylene glycol, polypropylene glycol, polytetramethylene glycol, hexamethylene glycol, dodecamethylene glycol, neopentyl glycol, and the like; alicyclic glycols such as cyclohexane dimethanol, and the like; and aromatic diols such as 2,2-bis (4'-β-hydroxyethoxyphenyl) propane. Particularly suitable polyesters are polyethylene terephthalates derived from terephthalic acid and ethylene glycol.

The polyester resins useful in this invention have an intrinsic viscosity of 0.5 to 1.5 and preferably 0.55 to 0.8. These polyester resins can be prepared by melt polymerization and processed by reduced pressure treatment at a temperature of 180° to 250° C. or by heat treatment in inert gas, or be prepared by solid phase polymerization with reducing of content of oligomer and acetaldehyde.

For the heat resistant resins employed in this invention, there may be used resins such as polyallylate, polycarbonate, polyethylene naphthalate, polacetal, polysulfone, polyether etherketone, polyethersulfone, polyetherimido, polyphenylensulfide, blend polymers of the above resins, blend polymers of the above resins with polyethylene terephthalate; and blend polymers of more than two kinds of the above resins with polyethylene terephthalate, "U POLYMER" (blend polymer of polyallylate and polyethylene terephthalate produced by YUNICHIKA Co., Ltd.), and "THERMX" (cyclohexane dimethanol modified copolyester produced by EASTMAN Co., Ltd.).

The polyester resins and the heat resistant resins employed in this invention may be mixed with other resins and additives such as a stabilizer, a pigment, an antioxidant, a heat stabilizer, an ultraviolet stabilizer, an antistatic agent, and an antimicrobial agent.

Next, the construction of the multi-layer parison of this invention will be explained.

Figure 1:
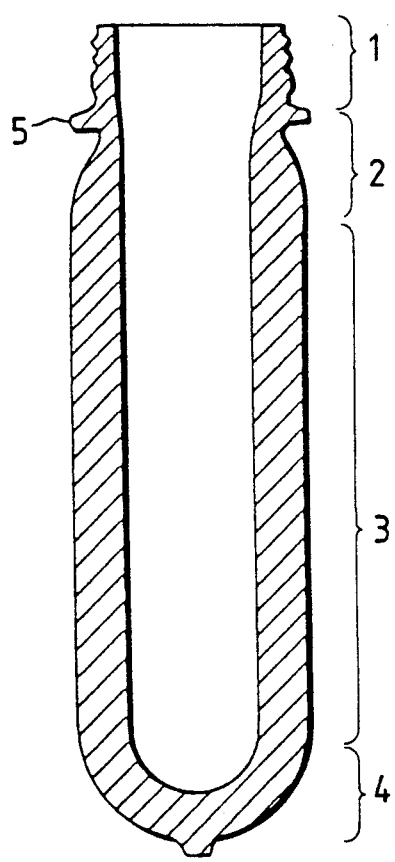
FIG. 1 is a longitudinal sectional view of a multi-layer parison according to this invention.

In FIG. 1, a multi-layer parison $P_1$ of this invention has a mouth portion 1, a shoulder portion 2, a support ring 5 disposed between the mouth portion 1 and the shoulder portion 2, a body portion 3 and a bottom portion 4. A plurality of layers comprising a plurality of heat resistant resin layers and polyester resin layers are formed at the mouth portion 1, the support ring 5 and the shoulder portion 2.

Figure 2:
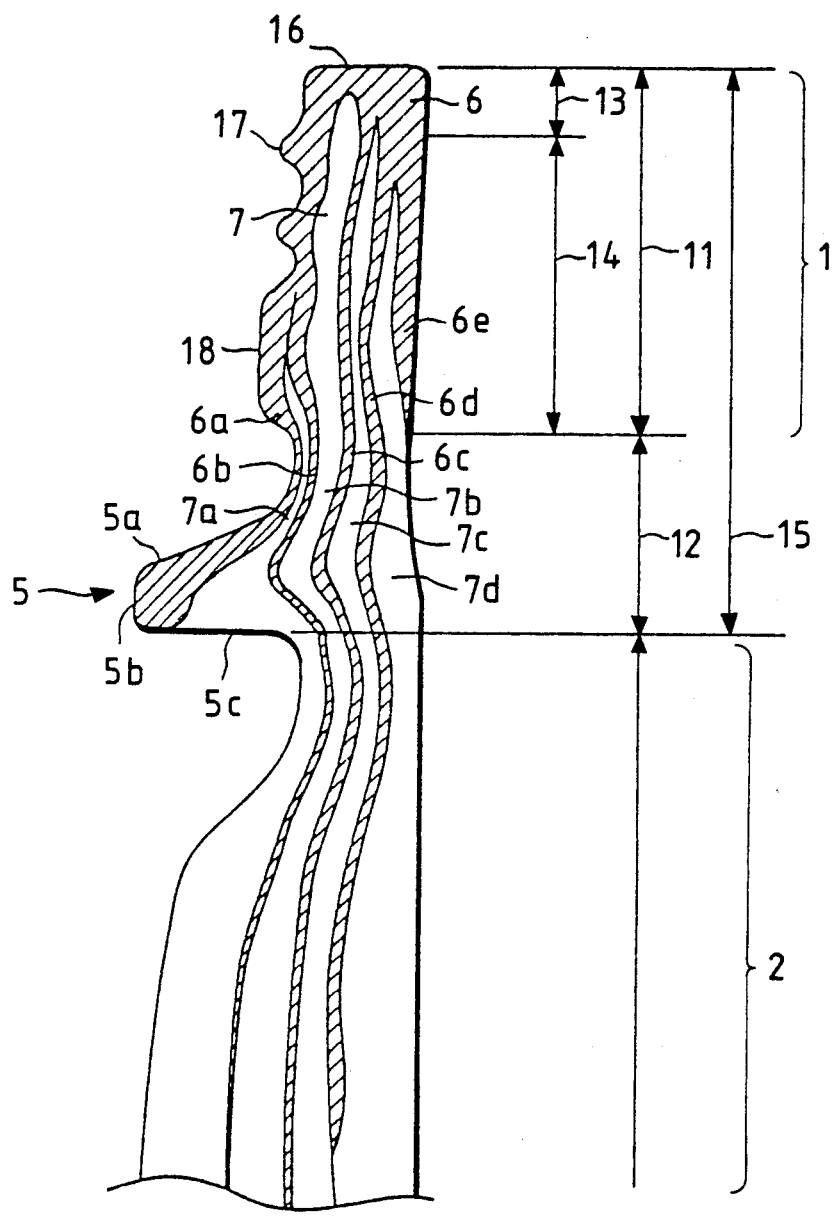
FIG. 2 is an enlarged view of two mouth and shoulder portions of the parison in FIG. 1.

FIG. 2 shows an enlarged sectional view of the multi-layer construction of the mouth portion 1, the support ring 5 and the shoulder portion 2. The mouth portion 1 includes a screw portion 11 and a part of the support ring portion 12, and the screw portion 11 comprises an opening end sealing portion 13 disposed between an opening end 16 and a first thread 17, an intermediate portion 14 disposed between the first thread 17 and a locking ring 18. A portion comprising the mouth portion 1 and the support ring 5, that is, the screw portion 11 and the support ring portion 12 is called a head pressure imparting portion 15 which is not stretched during a stretching blow molding operation.

The mouth portion 1 has a multi-layer structure in which a heat resistant resin layer 6 and a polyester layer 7 are disposed alternately. Five heat resistant resin layers 6a, 6b ... 6e are formed at the lower portion of the mouth portion 1 while each of four polyester layers 7a, 7b ... 7d is disposed between two adjacent heat resistant resin layers 6. The opening end 16 is totally covered with a heat resistant resin layer 6. The heat resistant resin layer 6a located at the outermost position (the outer surface of the mouth portion 1) is continuously extended to the upper surface 5a of the support ring 5 and its outer end surface 5b.

At the shoulder portion 2 are disposed a polyester resin layer 7a, a heat resistant resin layer 6b, a polyester resin layer 7b, a heat resistant resin layer 6c, a polyester resin layer 7c, a heat resistant resin layer 6d and a polyester resin layer 7d in this order from outside to inside. There are three heat resistant layers 6b, 6c, 6d at the shoulder portion 2. However, the lower surface 5c of the support ring 5 except its outer end surface 5b comprises approximately a polyester layer. In this manner, since a relatively fragile heat resistant resin layer is not formed at the root portion of the support ring 5 on which a stress is exerted, the support ring 5 is protected from a partial breakage or chipping.

The thicknesses of the heat resistant layers 6a, 6b ... 6e are not necessarily limited. However it is preferable that the more a position in the parison P approaches the opening end 16, the more a rate of weight of heat resistant layer 6 with respect to a total weight increases. The rates of weight of the heat resistant layer 6 at various positions of the parison are as follows.

The opening end sealing portion 13 (from the opening end 16 to the first thread 17) ... more than 70% (preferably 80 to 90%).

The thread portion 11 (from the opening end 16 to the lower end of the locking ring 18) ... more than 40% (preferably 50 to 60%).

The head pressure imparting portion 15 (from the opening end 16 to the lower end of the support ring 5) ... more than 30% (preferably 40 to 50%).

The shoulder portion ... more than 3% (preferably 5 to 10%).

Figure 3:
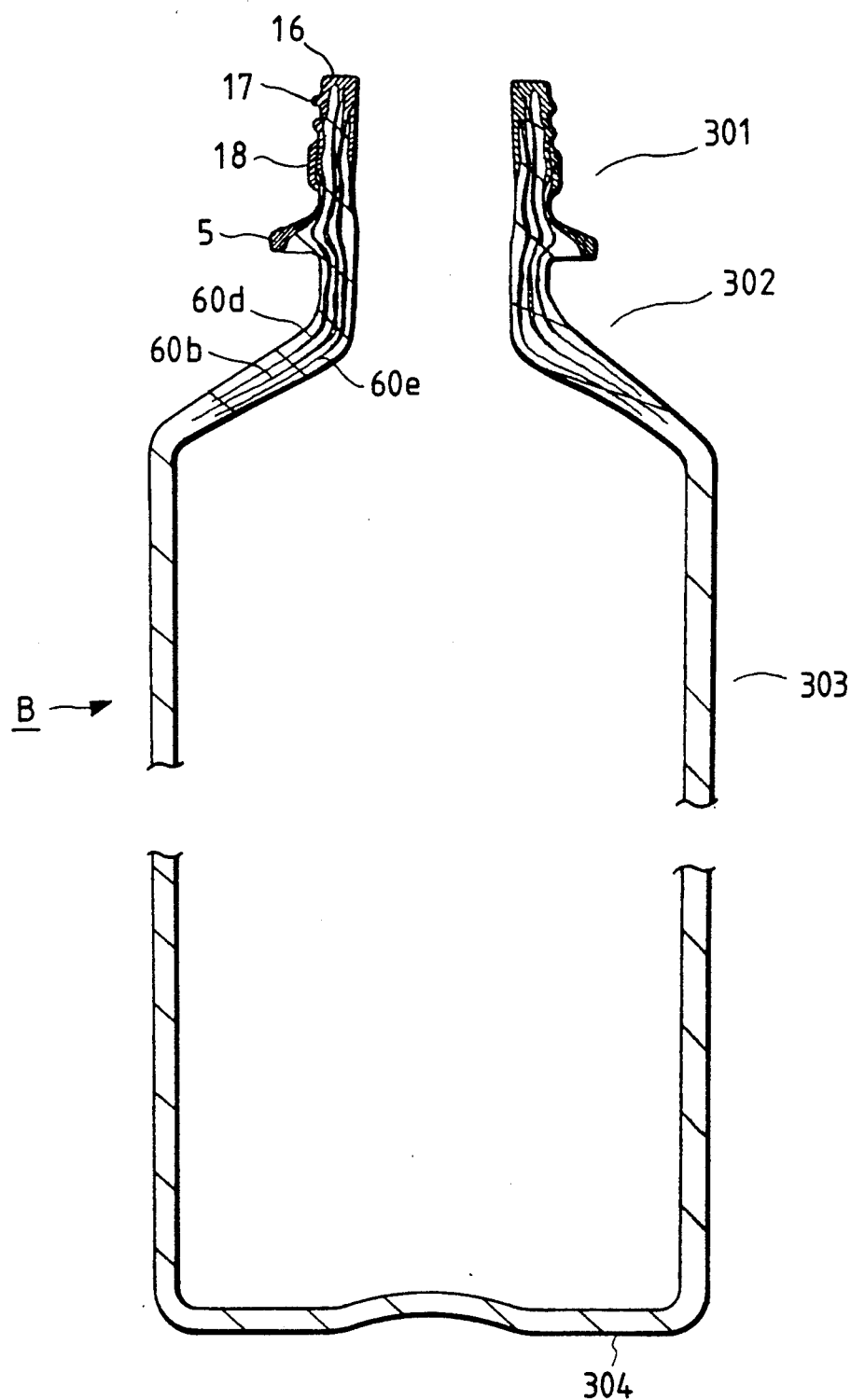
FIG. 3 is a longitudinally sectional view of a multi-layer bottle according to this invention.

If the rate of the heat resistant layer 6 at each position of the parison P is determined in this manner, a bottle B to be formed as shown in FIG. 3 can endure reliably a hot filling operation in which a liquid is poured into the bottle at a temperature of 80° to 95° C. and a pasteurizing operation in which the bottle B is subjected to hot shower for 30 minutes at a temperature of 70° to 80° C.

As mentioned above, a bottle B having a good heat resistance can be obtained by the provision of a plurality of heat resistant resin layers at the mouth portion 301 and the shoulder portion 302. Since the mouth portion 301 and the shoulder portion 302 of the bottle B are generally heated during the hot filling operation and the pasteurizing operation, the heat resistant layers are concentrated on the mouth portion 301 and the shoulder portion 302.

In this embodiment, a heat resistant resin layer is not substantially formed at the body portion 303 of the bottle B and the bottom portion 304 thereof. However, the body portion 303 and the bottom portion 304 each having no heat resistant resin layers can almost endure exposure for 20 minutes to an environment of a temperature of 60° C. Therefore, the two portions 303, 304 can endure two normal hot filling and pasteurizing operations. In addition, since the heat resistant resin is relatively expensive, the elimination of heat resistant resin layers from the body portion 303 and the bottom portion 304 decreases the cost of the bottle as a whole.

Next, a method of forming the above parison $P_1$ will be explained.

Figure 4:
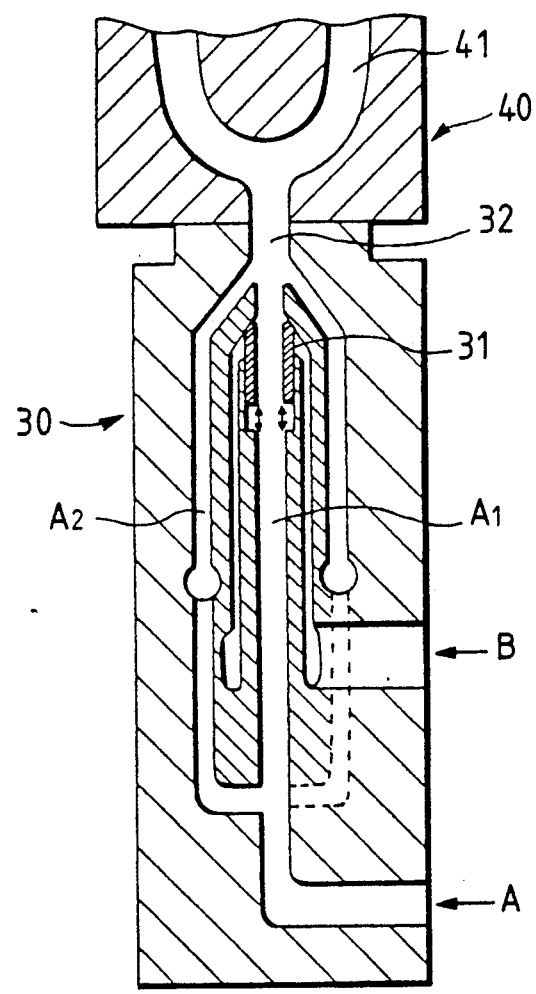
FIG. 4 is a longitudinally sectional view of a hot runner nozzle used for manufacturing the multi-layer parison.
Figure 5:
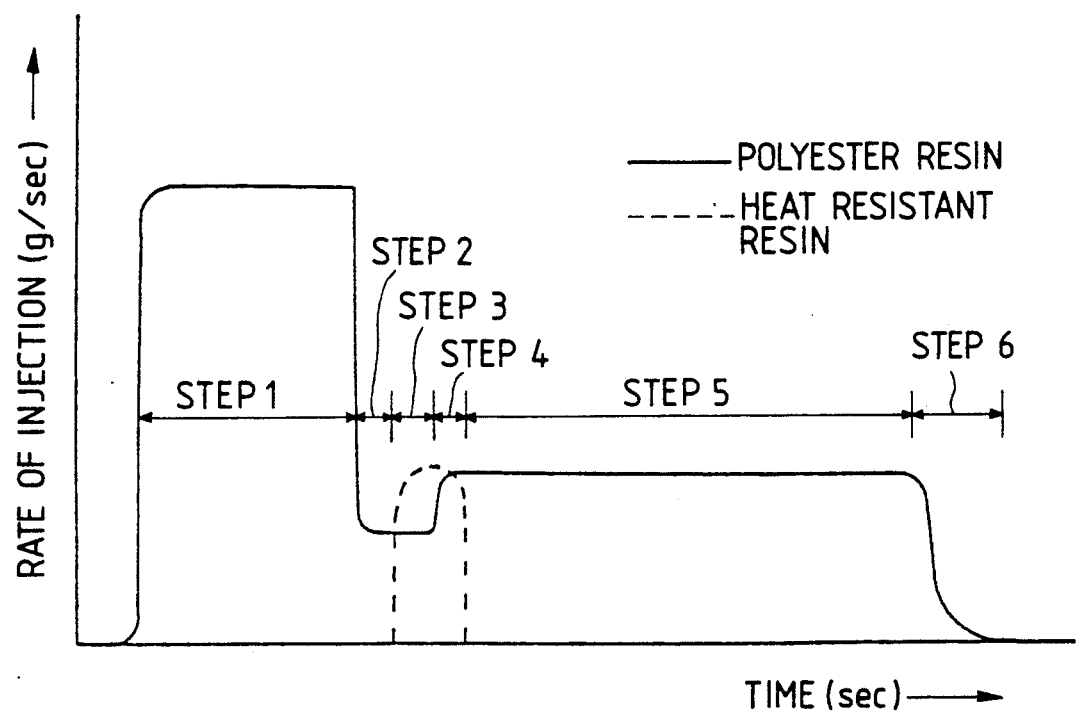
FIG. 5 is a graph showing a timing program for manufacturing the multi-layer parison.

The parison $P_1$ is formed by a hot runner nozzle 30 as shown in FIG. 4 and by timing injection of polyester resin together with resistant resin as shown in FIG. 5.

The hot runner 30 shown in FIG. 4 has two passages A, B, and the passage A comprises a linear passage $A_1$ located at the center position of the nozzle 30 and a cylindrical passage $A_2$ located outside of the passage $A_1$. The passage B is located between the two passages $A_1$ and $A_2$. At the upper end of the center passage $A_1$ is provided a check valve 31 which is moved vertically due to a difference in resin pressure between the two passages $A_1$ and B. In case that the resin pressure of the passage B is higher than that of the passage $A_1$ the passage B is opened. The passage B is opened to the passage $A_1$ and the two passages $A_1$, $A_2$ are joined together at the upper end of the nozzle 30 thereby to form a passage 32 having a large diameter.

A process for manufacturing the multi-layer parison $P_1$ by using the above hot runner nozzle 30 in reference to a program shown in FIG. 5 and ways of injection shown in FIGS. 6(a) to (d). In this embodiment, polyester resin is injected into the passage A while heat resistant resin mentioned above is injected into the passage B.

Figure 6:
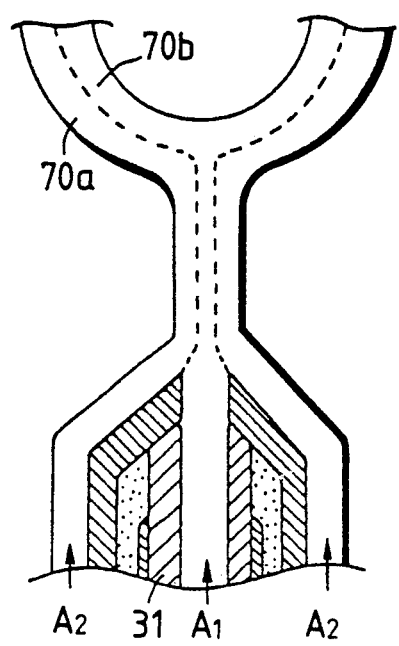
FIGS. 6(a) to (d) are partial sectional views showing a state where heat resistant resin and polyester resin are injected together, respectively.
Figure 6:
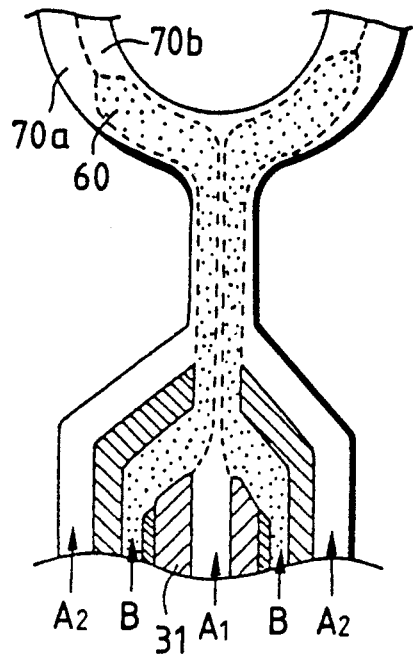
Figure 6:
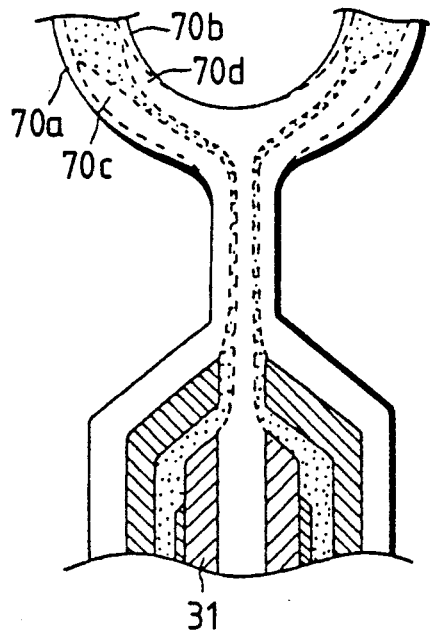
Figure 6:
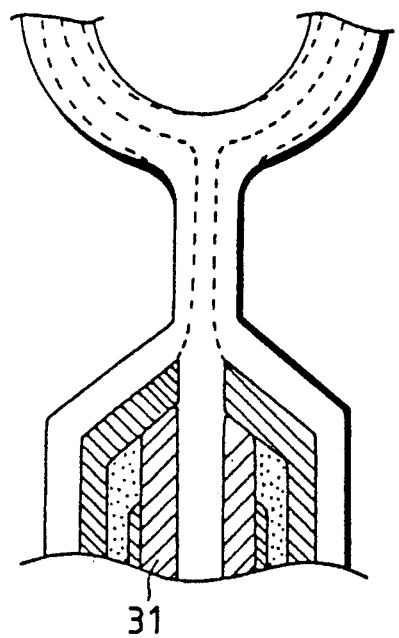

In step 1, polyester resin is injected into the passage A. At this time, the check valve 31 of the hot runner nozzle 30 is, as shown in FIG. 6(a), closed due to injection pressure of polyester resin, and only polyester resin is injected through the two passages $A_1$, $A_2$.

In step 2, the rate of injection of polyester resin is decreased. In step 3, heat resistant resin is injected through the passage B while polyester resin is injected in the same manner as in step 2. At this time, the injection pressure of heat resistant resin surpasses that of polyester resin. Therefore, the check valve 31 is opened in response to the difference in injection pressure between the heat resistant resin and the polyester resin, and the heat resistant resin is injected into the passage 32 in response to the difference.

The heat resistant resin injected in step 3 flows between two polyester resin layers 70a, 70b injected through the passages $A_1$, $A_2$. At this time, a heat resistant resin 60 flows between the two polyester resin layers 70a and 70b without contacting the inner walls of an injection mold 40 (FIG. 4). Therefore, the decrease of temperature of the heat resistant resin is little, and the heat resistant resin 60 has a good fluidity. Accordingly, the heat resistant resin layer 60 flows faster than the polyester resin layers 70a, 70b.

Further, in step 4, the rate of injection of polyester resin is increased while maintaining the injection of the resin. This causes two new polyester resin layers 70c, 70d in addition to the two polyester resin layers 70a, 70b to flow between the heat resistant resin layer 60 and the two polyester resin layers 70a, 70b, respectively. The check valve 31 is then slightly moved to close the passage B due to the increase of injection pressure of the polyester resin, and, accordingly, the thickness of the injected heat resistant resin is relatively small. The polyester resin layer 70c flows between the heat resistant resin layer 60 which flows narrowly at the center position of the cavity 41 and the polyester resin layer 70a which flows at the outer position of the cavity 41, and the polyester resin layer 7d flows between the heat resistant resin layer 60 and the polyester resin layer 70b at the outer position of the cavity 41. Therefore, the two new polyester resin layers 70c, 70d flow faster than the two polyester resin layers 70a, 70b.

In step 5, as shown in FIGS. 5 and 6(d), the injection of the heat resistant resin is stopped and the polyester resin is further supplied until the remaining space of the cavity 41 is filled with the polyester resin. Finally, the pressure of the cavity 41 is adjusted or maintained (step 6) to complete the injection.

If a multi-layer parison is formed according to the above-mentioned program, the lower position of the mouth portion 1 has a nine-layer structure (including five heat resistant resin layers), and the shoulder portion 2 has a seven-layer structure (including three heat resistant resin layers). The reason will now be explained with reference to FIGS. 7(a) to (e) which are views showing a state of the forward ends of resin layers.

Figure 7:
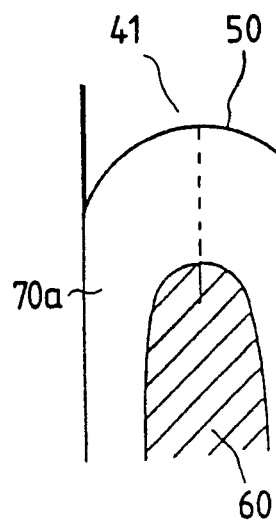
FIGS. 7(a) to (e) are views showing a state where a multi-layer structure including heat resistant resin and polyester resin is formed, respectively.
Figure 7:
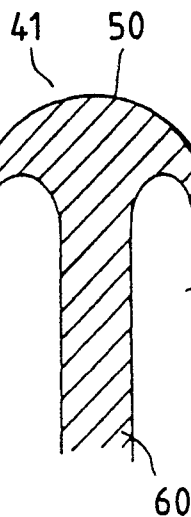
Figure 7:
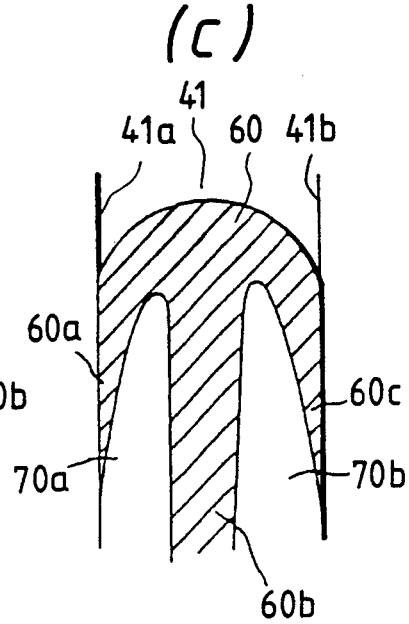
Figure 7:
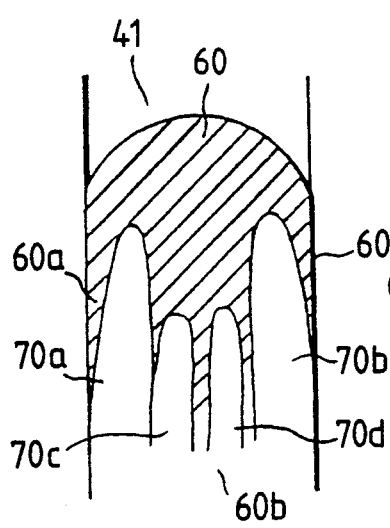
Figure 7:
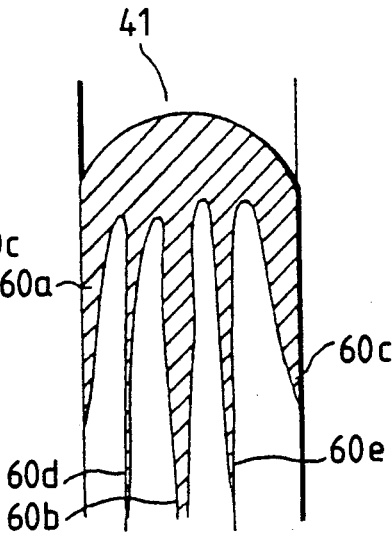

In step 3, when the heat resistant resin is, as shown in FIG. 6(b) and FIG. 7(a), injected between the two polyester layers 70a, 70b, the heat resistant resin layer 60 flows between the two polyester resin layers 70a and 70b. However, the heat resistant resin layer 60 moves faster than the polyester resin layers 70a, 70b to come near the forward end 50 of the polyester resin layers 70a, 70b as shown in FIG. 7(a). Then, the heat resistant resin layer 60, as shown in FIG. 7(a), passes by the two polyester resin layers 70a, 70b to occupy the forward end of the resin layers with the polyester resin in a state where the two polyester resin layers 70a, 70b are separated from each other to become thin layers, respectively. At this time, the upstream end portion of flowing resin has a three-layer structure including the polyester resin layer 70a, the heat resistant resin layer 60 and the polyester resin layer 70b. Thereafter, as shown in FIG. 7c), the heat resistant resin layer 60 flowing out of the upstream ends of the polyester resin layers 70a, 70b gradually occupies a position between the left wall surface 41a of the cavity 41 and the left outer surface of the layer 70a and a position between the right wall surface 41b of the cavity 41 and the right outer surface of the layer 70b because the amount of heat resistant resin flowing out of the polyester resin layers 70a, 70b increases gradually thereby to form two heat resistant resin layers 60a, 60c along the left and right wall surfaces 41a, 41b of the cavity 41. That is, the two polyester resins layers 70a, 70b are respectively tapered off and flow in the heat resistant resin. At that time, the flow of the resins makes a five-layer structure comprising the heat resistant resin layer 60a, the polyester resin layer 70a, the heat resistant resin layer 60b, the polyester resin layer 70b and the heat resistant resin layer 60c in this order from the left outside of the cavity 41 to the right outside thereof.

In step 4, the heat resistant resin and the polyester resin are, as shown in FIG. 6(c), injected together with each other. As the two new polyester resin layers 70c, 70d flow in the resins injected before and move faster than the two polyester resin layers 70a, 70b preceding the two new polyester resin layers 70c, 70d. Further, the fluidity of the heat resistant resin layer 60 is slightly decreased, at its surface contacting the polyester resin layers 70a, 70b, due to the slight decrease of its temperature, and, accordingly, the polyester resin layers 70c, 70d flow faster than the preceding polyester resin layers 70a, 70b. Then, a part of the heat resistant resin layer 60 is gradually left behind between the two polyester resin layers 70a and 70c and between the two polyester resin layers 70b and 70d, respectively, thereby to form finally two new heat resistant resin layers 60d, 60e. Consequently, nine-layer structure including five heat resistant resin layers 60a, 60b . . . 60e is obtained as shown in FIG. 7(e). The heat resistant resin layers 60b, 60d, 60e obtained in this manner are extended over the shoulder portion 2.

In this manner, the parison $P_1$ having a nine-layer structure including five heat resistant resin layers can be formed, at the lower portion of the mouth portion 1, by determining properly the amount and timing of injection of resins in consideration of the volume of the cavity 41.

As is apparent from the above explanation, step 4 is the most important to form five heat resistant resin layers at the lower portion of the mouth portion 1 of the parison $P_1$. Explaining in more detail, it is important to bring a phenomenon shown in FIGS. 7(d) and (e) by increasing the rate of injection of polyester resin without stopping the injection of the heat resistant resin.

In contrast, if the rate of injection of polyester resin is increased in a state wherein the injection of the heat resistant resin is stopped, the heat resistant resin located at the center position of the cavity 41 is not extended remarkably long, but shortened while each resin layer flows in the cavity 41. Finally, when each resin has reached the upper end of the cavity 41 (corresponding to the opening end 16 of the parison $P_1$ to be formed), the center heat resistant resin layer 60b disappears to form four heat resistant resin layers in total.

When the parison $P_1$ is made, it is important to determine properly, at the time of injection, the temperature of an injection cylinder, the injection pressure thereof, the difference in viscosity between polyester resin and heat resistant resin. Especially, as the viscosity of resin is remarkably influenced by its temperature, it is important to maintain constant the temperature of resin. For example, when polyethylene naphthalate is used as polyester resin, and U POLYMER is used as heat resistant resin, it is preferable that the polyethylene naphthalate is determined at a temperature 260° to 300° C. (more preferably 270° to 285° C.) while U POLYMER is determined at a temperature 270° to 310° C. (more preferably 280° to 295° C.).

The parison $P_1$ formed in this way is expanded and stretched through a stretching blow molding operation.

Figure 8:
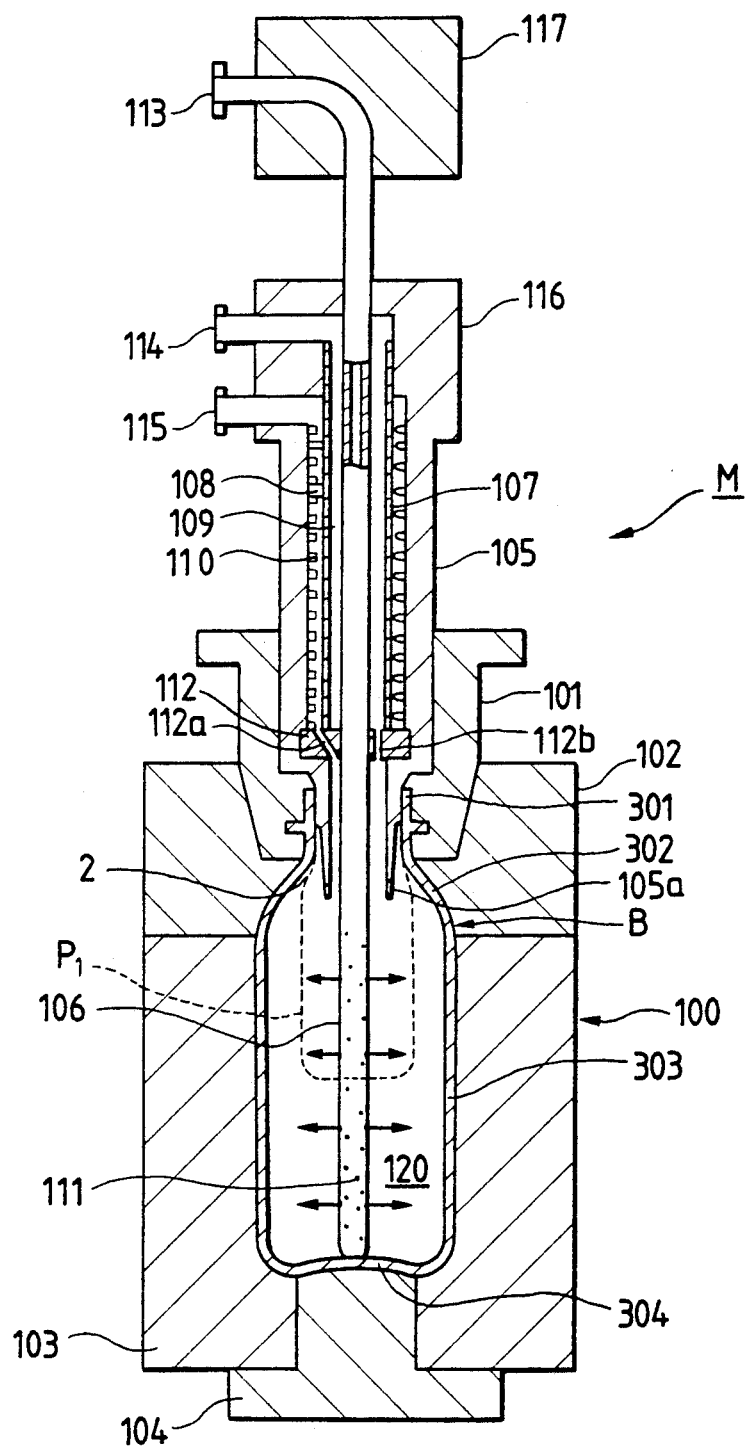
FIG. 8 is a vertically sectional view of a stretching blow molding apparatus according to this invention.

FIG. 8 shows a stretching blow molding apparatus M for manufacturing the multi-layer bottle B as shown in FIG. 3. The apparatus M comprises a blow mold 100 having a mouth forming mold 101, a shoulder forming mold 102, a body forming mold 103, and a bottom forming mold 104, a blow mandrel 105 fixed to the mouth forming mold 101 in an air-tight state, a stretching rod 106 for supplying cooling fluid into the parison $P_1$, as shown in FIG. 1, set in the blow mold 100, a fastening block 116 fixed to the upper end of the blow mandrel 105 and a stretching rod fastening block 117 for fastening the upper end of the stretching rod and for moving the stretching rod 106 vertically, The stretching rod 106 is slidably guided by a slide sleeve 112 to be located at the center position of the blow mandrel 105. The slide sleeve 112 has a hole 112a for supplying heated and compressed air into the parison $P_1$ and a hole 112 for discharging the heated and compressed air and cooling fluid from the parison $P_1$ to the outside. The blow mandrel 105 has a skirt portion 105a extending from the mouth forming mold 101 into the cavity 120 of the blow mold 100, and the lower end of the skirt portion 105a reaches a position corresponding to the upper portion of the shoulder portion of the bottle B. The skirt portion 105a guides blow-air into the cavity 120 of the parison $P_1$ in a manner that the blow-air does not hit directly the shoulder portion 2 of the parison $P_1$. Accordingly, even if the blow-air is expanded adiabatically, the shoulder portion 2 of the parison $P_1$ is not cooled thereby to prevent whitening of the shoulder portion 2 of the parison $P_1$.

The stretching rod 106 passes through the center portion of the blow mandrel 105. Around the stretching rod 106 are formed two passages 108, 109 between which a dividing sleeve 107 is provided. The passage 108 is provided with a sheathed tubular heater 110. The stretching rod 106 is tubular and cooling fluid can flow therein. The stretching rod 106 has a lower portion provided with a plurality of ejection holes 111, 111 . . . 111, which is inserted into the cavity 120 of the blow mold 100. The stretching rod 106 also has an opening 113 at the upper end thereof which is projected laterally from the fastening block 117, and two openings 114, 115 are formed at the upper ends of the passages 108, 109, respectively. Heated end compressed air and cooling fluid are discharged from the hole 112b of the sleeve 112 through the discharging passage 109.

Figure 9:
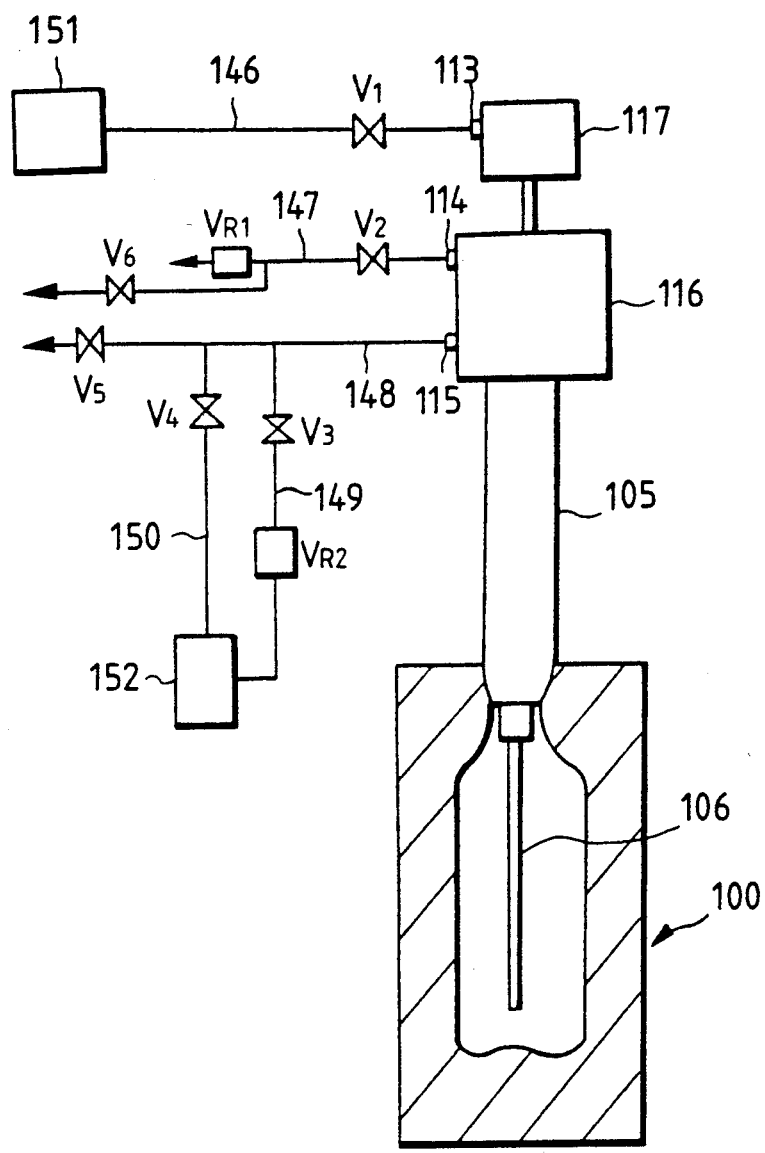
FIG. 9 is a pipe line system for supplying blow-air and cooling air into the apparatus in FIG. 8.

FIG. 9 shows a pipe line system for supplying compressed air into the blow molding apparatus M and for discharging it therefrom. In this embodiment, the opening 113 is connected to a cooling fluid source 151 through a pipe 146, the opening 114 is connected to a relief valve $VR_1$ through a pipe 147, and the opening 115 is connected to a compressed air source 152 through three pipes 148, 149, 150. The pipe 146 is provided with a valve $V_1$, the pipe 147 is provided with two valves $V_2$, $V_6$, the pipe 149 is provided with a valve $V_3$ and a pressure reducing valve $VR_2$, and the pipe 150 is provided with a valve $V_4$. The pipe 148 is provided with a valve $V_5$ at a branched position from the pipe 150.

Through this pipe line system, heated and compressed air and cooling fluid are supplied into and discharged from the parison P! set in the blow mold 100 in the following manner.

(1) First blow step

The valve $V_3$ is opened with the two valves $V_4$, $V_2$ closed to supply the compressed air from the compressed air source 152 into the passage 108.

(2) Second blow step

The valve $V_4$ is opened with the two valves $V_1$, $V_4$ closed to supply the compressed air from the compressed air source 152 into the passage 108.

(3) First discharging step

The valve $V_2$ is opened with the three valves $V_1$, $V_3$, $V_4$ closed to discharge heated and compressed air from the system. At this time, the valve $V_5$ may be opened.

(4) Cooling blow step

The two valves $V_1$, $V_2$ are opened with the three valves $V_3$, $V_4$, $V_5$ closed to supply cooling fluid from the cooling fluid source 151 into path of stretching rod 106. At that time, since the valve $V_2$ is opened, the relief valve $VR_1$ functions to maintain constant the pressure of the cooling fluid for cooling the parison $P_1$ quickly.

(5) Cooling fluid discharging step

The two valves $V_2$, $V_6$ are opened with the four valves $V_1$, $V_3$, $V_4$, $V_5$ closed.

The above steps are repeated for each cycle for a biaxial stretching blow molding operation.

In steps (1) and (2), a biaxial stretching blow molding operation is carried out for manufacturing the bottle B. The compressed air is then heated by the sheathed tubular heater 110 to a predetermined temperature when the compressed air passes through the passage 108 in the blow mandrel 105. The temperature of the compressed air is above 30° C. preferably 70° to 300° C., and more preferably 80° to 100° C. The pressure thereof is 3 to 50 kg/cm², preferably 15 to 50 kg/cm², and more preferably 20 to 40 kg/cm².

In this embodiment, the air pressure of first blow step (1) is relatively low as 3 to 10 kg/cm², and air pressure of second blow step (2) is at the above level. The heated air prevents the occurrence of a whitening phenomenon at the shoulder portion 2 comprising polyester resin layers and heat resistant resin layers. Through steps (1) and (2), the stretching rod 106 is lowered by the fastening block 117 into the parison $P_1$ to stretching the parison $P_1$ in its longitudinal direction.

After the heated and compressed air is supplied to perform a biaxial stretching blow molding operation together with the stretching rod 106, the supplied air is held in the bottle B for 3 to 50 seconds thereby to push the wall of the bottle B onto the inner wall of the blow mold 100. Heat treatment is then performed. That is, the mouth forming mold 101 of the blow mold 100 contacts the mouth portion 1 of the bottle B which includes much heat resistant resin and is hardly stretched while the shoulder forming mold 102 contacts the shoulder portion 2 of the parison $P_1$, which includes a little heat resistant resin and is stretched at an intermediate level. The body forming mold 103 contacts the body portion 303 of the bottle B which does not include heat resistant resin and is stretched at the highest level while the bottom forming mold 104 contacts the thick bottom portion 304 of the bottle B, which does not include heat resistant resin and is stretched at a low level. Each part of the blow mold 100 is maintained at a predetermined temperature to perform heat treatment to the stretched bottle B at each of four different temperatures. The temperatures of the parts of the blow mold 100 are determined in consideration of rate of heat resistant resin and the difference of the rate of stretching. The temperature of the mouth forming mold 101 is determined at the temperature below a glass transition temperature of polyester, the temperature of the bottom forming mold 104 is determined at a temperature in a region of the glass transition temperature ±15° C., and the temperatures of the shoulder forming mold 102 and the body forming mold 103 are determined at temperatures of a glass transition temperature to a crystallization temperature, respectively. That is, the temperature of the mouth forming mold 101 is 20° C. to 60° C., the temperature of the shoulder forming mold 102 is 95° to 103° C., the temperature of the body forming mold 103 is 85° C. to 130° C., and the temperature of the bottom forming mold 104 is 60° C. to 80° C. However, the temperature of each mold varies slightly with a change of kind of heat resistant resin. The shoulder mold 102 is preferably determined at the same temperature as that of the body forming mold 103 or at a temperature above that of the body forming mold 103.

In steps (3) and (4), the heated air is discharged from the opening 114 through the hole 112b and the passage 109 while the cooling fluid is supplied into the bottle B through the stretching rod 106 thereby to cool the bottle B rapidly. This rapid cooling can almost prevent the bottle having been formed from being deformed at a time of mold releasing thereby to obtain the bottle B having a constant size. The cooling fluid is supplied, at a constant pressure, into the stretching rod 106 from the opening 113. The cooling fluid is ejected into the cavity 120 through a plurality of holes 111 provided at the lower portion thereof to cool the wall of the stretched bottle B. The temperature of the cooling fluid is below 50° C., and preferably 5° to 20° C., and the pressure thereof is 0 to 30 kg/cm², and preferably 5 to 15 kg/cm². As cooling liquid, cooling air, liquid nitrogen or other gases are used. In case that nitrogen gas obtained by vaporizing liquid nitrogen is used as the cooling liquid, it is preferable that the stretching rod 106 has a double tube structure to protect adiabatically the cooling fluid from the sheathed tubular heater 108 and the heated and compressed air flowing upward in the passage 109. If the space between double tubes is made vacuum, adiabatic ability is more increased. It is preferable that the liquid nitrogen is supplied into the stretching rod 106 in a state of liquid and is vaporized to expand when it is ejected through the holes 111 of the stretching rod 106 into the cavity 120 thereby to increase effect of rapid cooling.

In step (5), the cooling liquid is discharged from the opening 114 through the passage 109 in the below mandrel 105 after a cooling operation. Therefore the bottle B having been stretched contacts always fresh cooling fluid supplied smoothly to be cooled rapidly. At that time, the relief valve $VR_1$ functions to maintain constant the pressure of the cooling fluid. The period of time for cooling the bottle B is normally 1 to 10 seconds in the case of cooling air and 1 to 5 seconds in the case of liquid or vaporized nitrogen gas. The rapid cooling operation cools the bottle B to a temperature of 60° to 90° C. The blow mold 100 is separated immediately after the cooling operation is performed so that the bottle B is not heated again. Thus, the multi-layer heat resistant bottle B as shown in FIG. 8 can be obtained.

Figure 10:
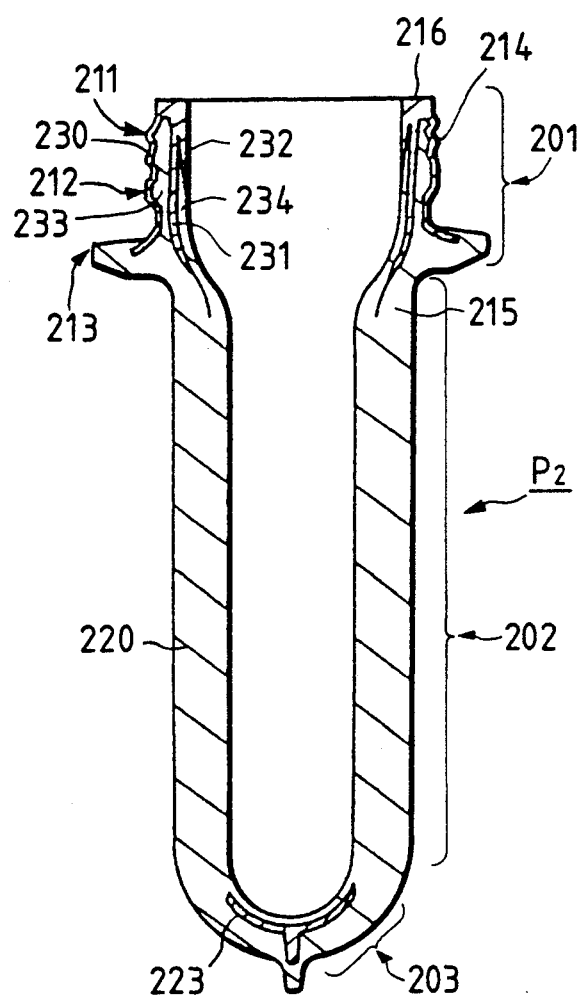
FIG. 10 is a vertically sectional view of another parison according to this invention.
Figure 11:
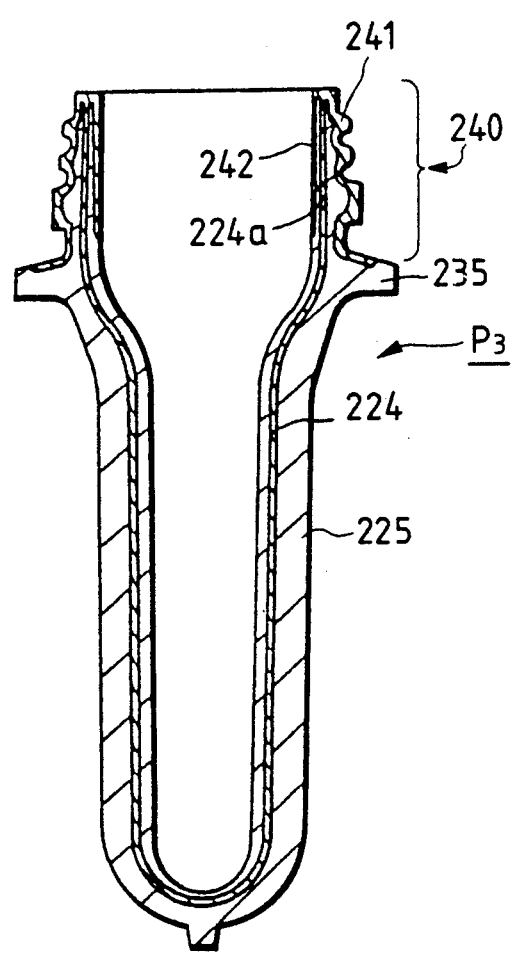
FIG. 11 is a vertical sectional view of still another parison according to this invention.

In the parison $P_1$ formed by the method according to the above embodiment, five heat resistant resin layers are formed at the lower portion of the mouth portion 2 of the parison $P_1$. However, as shown in FIGS. 10 and 11, even if three heat resistant resin layers are formed at the mouth portions of two parisons $P_2$, $P_3$, each mouth portion has enough heat resistance. The two parisons $P_2$, $P_3$ can be obtained by changing the timing of injection of resins according to a predetermined timing program.

The parison $P_2$ comprises a mouth portion 201, a body portion 202 and a bottom portion 203. The mouth portion 201 has a thread 211, a locking ring 212 and a support ring 213. At the lower portion of the mouth portion 201 are provided three heat resistant resin layers 230, 231, 232, and the outermost layer 230 located at the outer surface of the mouth portion 201 is extended over the support ring 213. Each of the three heat resistant resin layers 230, 231, 232 is disposed alternately with two polyester resin layers 233, 234. The opening end 216 of the mouth portion 201 is totally covered with heat resistant resin. The body portion 202 comprises only a polyester resin layer 220, and the bottom portion 203 has at least one heat resistant resin layer 223.

The parison $P_3$ has a heat resistant resin layer 224 provided in the whole wall thereof. At the mouth portion 240 is provided three heat resistant resin layers 241, 224a, 242, and the outermost layer 241 is extended over the support ring 234.

A concrete example of this invention will now be explained.

MITSUI PETJ 125 (produced by MITSUI SEKIYUKAGAKU Co., Ltd.) was used as polyethylene terephthalate resin, and blend polymer (U POLYMER produced by YUNICHIKA Co., Ltd.) of polyethylene terephthalate and polyallylate is used as heat resistant resin.

ASB 650 NHT (produced by NISSEI ASB MACHINE Co., Ltd.) was used as an injection mold for the parison, and the hot runner nozzle shown in FIG. 4 was connected to the injection mold. The parison was formed according to the timing program shown in FIG. 5. Polyethylene terephthalate was injected at a temperature of 272° C., and U POLYMER was injected at a temperature of 284° C. The rate of injection of polyethylene terephthalate was 7.47 g/sec in step (1) and 1.8 g/sec in steps (2) and (3). The rate was gradually increased from 1.8 g/sec to 2.8 g/sec in step (4) and was maintained at 2.8 g/sec in step (5). The maximum value of the injection rate of U POLYMER was 2.8 g/sec.

The parison obtained in this manner was cut in its longitudinal direction so as to observe its section. The existences of nine layers including three heat resistant resin layers and seven layers including three heat resistant layers at the lower portion of the mouth portion and the shoulder portion were confirmed, respectively.

The rates of U POLYMER occupying each part of the parison were 85% at the opening sealing portion 13, 55% at the screw portion 11, the head pressure imparting portion 15 and 4% at the shoulder portion 2. These rates show volume ratios and were calculated by measuring density on the basis of the difference between polyethylene terephthalate and U POLYMER.

The parison obtained was set in the stretching blow mold 100. The temperatures of the mouth forming mold 101, the shoulder forming mold 102, the body forming mold 103 and the bottom forming mold 104 were determined at 40° C., 102° C., 105° C. and 70° C., respectively. Heated and compressed air was supplied at a temperature of 80° C. and at a pressure of 30 kg/cm². The air was held in the blow mold 100 for 18 seconds and was then discharged. Thereafter, cooling air was ejected through the stretching rod 106 at a temperature of 25° C. into a cavity at a pressure of 10 kg/cm² to cool the bottle.

The bottle obtained in this manner was subjected to a hot filling operation at a temperature of 83° to 87° C. and to a pasteurizing operation at a temperature of 65° to 70° C. At this time, it was confirmed that the mouth portion and the shoulder portion of the bottle had enough heat resistance, respectively.

What is claimed is:

1. A parison for manufacturing a bottle made of polyester resin and heat resistant resin, which comprises:
   a) a mouth portion with an opening, which has a multilayer structure including at least two layers of heat resistant resin and at least two polyester resin layers alternately disposed with respect to the heat resistant resin layers, said heat resistant resin being formed of a mixture of polyallylate with polyethylene terephthalate, the outer periphery and an opening end of the mouth portion being formed of one of said heat resistant resin layers;
   b) a shoulder portion connected to the mouth portion;
   c) a support ring provided at a portion of the mouth portion near said shoulder portion and projecting outwardly therefrom, the heat resistant resin layer at the outer periphery of the mouth portion extending from the opening end of the mouth portion to the support ring;
   d) a body portion; and
   e) a bottom portion.

2. A parison according to claim 1, wherein the mouth portion has a nine-layer structure including five heat resistant resin layers at least at a portion of the mouth portion near said support ring.

3. A parison according to claim 2, wherein the nine-layer structure includes a heat resistant resin layer, a polyester resin layer, a heat resistant resin layer, a polyester resin layer, a heat resistant resin layer, a polyester resin layer, a heat resistant resin layer, a polyester resin layer and a heat resistant resin layer in this order from an outer face of the parison to an inner face thereof.

4. A parison according to claim 1, wherein the shoulder portion includes a polyester resin layer, a heat resistant resin layer, a polyester resin layer, a heat resistant resin layer, a polyester resin layer, a heat resistant resin layer and a polyester resin layer in this order from an outer face of the parison to an inner face thereof.

5. A parison according to claim 1, wherein weight ratio of heat resistant resin is increased gradually from a lower portion of the mouth portion to the opening end thereof, the weight ratio being above 70% at the opening end of the mouth portion, above 40% at a screw portion thereof and above 30% at a head pressure imparting portion thereof.

6. A parison according to claim 1, wherein each of the body portion and the bottom portion comprises only a polyester resin layer.

7. A parison according to claim 1, wherein the polyester resin is polyethylene terephthalate.

8. A bottle manufactured in a manner that a multilayer parison is expanded and stretched by blow-air, said bottle comprising:
   a) a mouth portion with an opening, which has a multilayer structure including at least two layers of heat resistant resin and at least two polyester resin layers alternately disposed with respect to the heat resistant resin layers, said heat resistant resin being formed of a mixture of polyallylate with polyethylene terephthalate, the outer periphery and an opening end of the mouth portion being formed of one of said heat resistant resin layers;
   b) a shoulder portion connected to the mouth portion;
   c) a support ring provided at a portion of the mouth portion near said shoulder portion and projecting outwardly therefrom, the heat resistant resin layer at the outer periphery of the mouth portion extending from the opening end of the mouth portion to the support ring;
   d) a body portion; and
   e) a bottom portion.

9. A bottle according to claim 8, wherein the mouth portion has a nine-layer structure including five heat resistant resin layers at least at a portion of the mouth portion near said support ring.

* * * * *